(12) United States Patent
Brouwer et al.

(10) Patent No.: US 9,027,467 B2
(45) Date of Patent: May 12, 2015

(54) SYSTEM AND METHOD FOR PREPARING A BEVERAGE SUITABLE FOR CONSUMPTION, AND A USE OF SUCH A SYSTEM, A RECEIVING CHAMBER AND A HOLDER

(75) Inventors: Gustaaf Frans Brouwer, KC Nijkerk (NL); Gerbrand Kristiaan De Graaff, BK Lisse (NL); Hendrik Cornelis Koeling, Utrecht (NL); Philippe Jacques van Camp, WB Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 1099 days.

(21) Appl. No.: 11/988,583

(22) PCT Filed: Jul. 12, 2006

(86) PCT No.: PCT/NL2006/000356
§ 371 (c)(1),
(2), (4) Date: Jan. 14, 2009

(87) PCT Pub. No.: WO2007/008067
PCT Pub. Date: Jan. 18, 2007

(65) Prior Publication Data
US 2009/0178571 A1 Jul. 16, 2009

(30) Foreign Application Priority Data
Jul. 12, 2005 (NL) .................................... 1029503

(51) Int. Cl.
A47J 31/06 (2006.01)
A47J 31/46 (2006.01)
A47J 31/36 (2006.01)

(52) U.S. Cl.
CPC ............ *A47J 31/467* (2013.01); *A47J 31/0678* (2013.01); *A47J 31/36* (2013.01)

(58) Field of Classification Search
USPC ........................ 99/302 R, 295, 307; 239/524; 366/156.1, 338, 340
See application file for complete search history.

(56) References Cited

U.S. PATENT DOCUMENTS 2,725,008 A * 11/1955 Okie .............................. 99/283
3,433,464 A    3/1969 Swafford et al.

(Continued)

FOREIGN PATENT DOCUMENTS

DE      40 37 366 A1   5/1992
DE      42 13 895 A1   11/1992

(Continued)

OTHER PUBLICATIONS

International Search Report for PCT/NL2006/000356, date of mailing, Oct. 13, 2006, 3 pages.

*Primary Examiner* — Gene Kim
*Assistant Examiner* — Matthew B Stanczak
(74) *Attorney, Agent, or Firm* — Foley & Lardner LLP

(57) ABSTRACT

A system for preparing a beverage suitable for consumption, for instance coffee and/or tea, is disclosed. The system comprises an apparatus for dispensing beverage under pressure to a nozzle of the system, and at least one receiving chamber which is placeable or is placed downstream of this nozzle. During use, the nozzle spouts a jet of the beverage with relatively high velocity to and/or into the receiving chamber. The receiving chamber is provided with at least one outflow opening for dispensing beverage received in this chamber. The system is at least configured to substantially counteract or prevent formation of foam of this beverage, in particular when the beverage is spouted to and/or into the receiving chamber. Further disclosed is an assembly at least provided with a holder, to a holder, a receiving body, the use of a said system and to a method for preparing a beverage suitable for consumption.

35 Claims, 7 Drawing Sheets

(56) References Cited

U.S. PATENT DOCUMENTS

| | | | |
|---|---|---|---|
| 4,253,385 A | 3/1981 | Illy | |
| 4,694,740 A | 9/1987 | Daloz et al. | |
| 5,150,645 A | 9/1992 | Schiettecatte | |
| 5,265,519 A | 11/1993 | Schiettecatte et al. | |
| 5,638,740 A | 6/1997 | Cai | |
| 6,009,792 A * | 1/2000 | Kraan | 99/295 |
| 6,119,582 A * | 9/2000 | Akkerman-Theunisse et al. | 99/323.1 |
| 6,499,689 B1 | 12/2002 | Miyazaki | |
| 6,769,352 B2 | 8/2004 | de Bruin et al. | |
| 6,840,158 B2 | 1/2005 | Cai | |
| 7,591,217 B2 * | 9/2009 | Kodden et al. | 99/302 R |
| 7,703,381 B2 * | 4/2010 | Liverani et al. | 99/295 |
| 7,703,383 B2 * | 4/2010 | Knitel | 99/302 R |
| 7,836,818 B2 * | 11/2010 | Noordhuis | 99/295 |
| 7,836,819 B2 * | 11/2010 | Suggi Liverani et al. | 99/295 |
| 8,113,106 B2 * | 2/2012 | Duineveld et al. | 99/295 |
| 8,418,602 B2 * | 4/2013 | Magg et al. | 99/295 |
| 2004/0005384 A1 * | 1/2004 | Cai | 426/77 |
| 2004/0107841 A1 | 6/2004 | Cai | |
| 2004/0112223 A1 * | 6/2004 | De'Longhi | 99/279 |
| 2004/0241307 A1 * | 12/2004 | Knitel | 426/594 |
| 2005/0155494 A1 * | 7/2005 | Brouwer et al. | 99/279 |
| 2006/0000364 A1 * | 1/2006 | Lau et al. | 99/295 |
| 2006/0230942 A1 * | 10/2006 | Noordhuis | 99/275 |
| 2007/0028783 A1 * | 2/2007 | Chen et al. | 99/513 |
| 2007/0186784 A1 * | 8/2007 | Liverani et al. | 99/295 |
| 2007/0243294 A1 * | 10/2007 | Hayes et al. | 426/135 |
| 2007/0289453 A1 * | 12/2007 | Halliday et al. | 99/295 |

FOREIGN PATENT DOCUMENTS

| | | |
|---|---|---|
| DE | 44 24 835 A1 | 1/1996 |
| EP | 1 210 893 A2 | 6/2002 |
| GB | 989996 | 4/1965 |
| NL | 7215523 | 5/1974 |
| NL | 1013270 | 4/2001 |
| WO | WO 89/12416 A2 | 12/1989 |
| WO | WO 2004/056246 A1 | 7/2004 |
| WO | WO-2005/016095 | 2/2005 |
| WO | WO 2005/016095 A1 | 2/2005 |
| WO | WO-2005/058109 | 6/2005 |
| WO | WO 2005/058109 A1 | 6/2005 |
| WO | WO 2005/063094 A1 | 7/2005 |

* cited by examiner

SYSTEM AND METHOD FOR PREPARING A BEVERAGE SUITABLE FOR CONSUMPTION, AND A USE OF SUCH A SYSTEM, A RECEIVING CHAMBER AND A HOLDER

CROSS-REFERENCE TO RELATED APPLICATIONS

The present application claims priority as a national stage application of International Patent Application Serial No. PCT/NL2006/000356 filed on Jul. 12, 2006, and The Netherlands Application Serial No. NL1029503 filed on Jan. 12, 2005, which are both hereby incorporated herein by reference in their entirety.

BACKGROUND

The invention relates to a system for preparing a beverage suitable for consumption.

Such a system is known from Dutch patent NL1006039. This patent describes an apparatus for preparing coffee extract with a small-bubbled foam layer, provided with at least one inlet for coffee extract and an outflow opening for discharging coffee extract with a small-bubbled foam layer. The inlet is provided with at least one spout opening for generating a coffee extract jet when coffee extract is fed to the inlet. The known apparatus is provided with a buffer reservoir, which is positioned such that during use, the coffee extract jet spouts into a liquid surface of coffee extract already received in the buffer reservoir. An advantage of the known apparatus is that it can prepare a coffee extract with a small-bubbled foam layer also under low pressure.

The object of the present invention is a completely new system for preparing a beverage suitable for consumption, for instance coffee, tea and/or other beverage.

SUMMARY

According to one aspect of the invention, the system is provided with an apparatus for dispensing beverage under pressure to a nozzle of the system, and at least one receiving chamber which is placeable or is placed downstream relative to this nozzle, the arrangement being such that, during use, the nozzle spouts a jet of this beverage with a relatively high velocity to and/or into the receiving chamber, the receiving chamber being provided with at least one outflow opening for dispensing beverage received in this chamber, wherein the system is at least configured to counteract or prevent formation of foam of this beverage, in particular when the beverage is spouted to and/or into the receiving chamber.

During use, the system can for instance prepare a beverage, with a beverage jet generated under relative low, superatmospheric pressure, while formation of foam can be counteracted or be substantially prevented. The system can, for instance, be suitable for preparing substantially foamless tea, coffee and/or other foamless beverages suitable for consumption.

According to a further elaboration of the invention, the system is designed to substantially gradually decelerate the beverage jet, and spreading it over, for instance, a specific surface and/or guide it along a decelerating path, to then dispense the decelerated beverage via an outflow opening mentioned. Optionally, the decelerated beverage may first be received or collected in, for instance, a collecting channel, to thence be dispensed to the outflow opening.

The system can further be configured to first, convert, during use, the beverage jet into at least one substantially continuous beverage flow, and to then dispense the substantially continuous beverage flow via the outflow opening. Such a continuous beverage flow can also, for instance, first be received or collected, for instance in an area where the beverage has a relatively low flow velocity, for instance in a collecting channel, to thence be dispensed to the outflow opening.

In this manner, formation of foam can be prevented well. The beverage flow can have, for instance, a substantially constant layer thickness or film thickness, especially during the substantially gradual deceleration of the beverage. The beverage flow is for instance continuous in a manner such that accumulation of beverage in the receiving chamber, in particular there where the beverage has a relatively high flow velocity, can be prevented. It will be clear to the skilled person that the formation of the continuous beverage flow can depend, inter alia, on a beverage flow rate, jet flow velocity, the composition of the beverage and/or other factors. It will be clear that such factors are geared to each other in a simple manner, by means of trial and error methods, in a manner such, that this beverage flow can be obtained during use. It will furthermore be clear that such factors can also be set with customary calculating models or computer simulations. Through, in particular, gradual deceleration of the beverage, downstream relative to the nozzle, good results can be obtained.

According to one aspect of the invention, the system is provided with a foam formation preventing surface which receives the beverage jet during use of the nozzle. The foam formation preventing surface can be designed such that the beverage jet can spread and/or flow away along this surface, in particular as a beverage layer or beverage film flowing in a substantially laminar manner, substantially without forming foam. Such a surface can be designed in various manners; in the following, a few non-limitative examples will be described. The foam formation preventing surface can, for instance, be a beverage jet decelerating surface. Preferably, the foam formation preventing surface is a substantially smooth surface, so that the beverage can flow therealong substantially without turbulence, and can, in particular, stick to the surface. In this manner, for instance whipping in of air, and, hence formation of foam can be prevented surprisingly well. Without wishing to be bound to any theory, a possible explanation is that for instance the velocity (energy, respectively) of the beverage spreading over the surface, viewed in flow direction, can gradually decrease, in particular when, during use, the layer thickness of the beverage film then remains substantially constant. This decrease in velocity (decrease in energy, respectively) may be such that the beverage has insufficient energy for, still, whipping in air. After the velocity of the beverage flow has decreased, the beverage flow may be dispensed via the outflow opening without formation of foam.

According to one aspect of the invention, the system is provided with a beverage jet receiving body which is placeable or is placed downstream relative to the nozzle, which body is designed to substantially counteract or prevent formation of foam of the beverage, in particular when the beverage is spouted onto or into this body.

The beverage jet receiving body can, for instance, be placeable or be placed in the receiving chamber. This receiving body can further be provided with an above-mentioned foam formation preventing surface.

In one elaboration of the invention, the receiving body can be brought at least from a foam preventing position, downstream relative to the nozzle, to another position. In this other position, the receiving body can for instance not be used for counteracting or preventing foam formation. This other position can comprise various positions, for instance a storing position, a position removed from the receiving chamber, a position in which the receiving chamber can indeed effect foam formation, and/or the like.

In one embodiment of the invention, the receiving body is of substantially mushroom-shaped design. The receiving body can for instance be provided with a dish-shaped upper part with a convex top side, and further with, for instance, a stem extending under this upper part. The receiving body can further for instance be of at least partly spherical design, and/or flat, and/or comprise a curled surface and/or designed otherwise.

According to one aspect of the invention, the system is designed such that during use, the system substantially prevents turbulence of the beverage when the beverage is spouted to and/or into the receiving chamber. The system can further be designed such that during use, the system substantially prevents the beverage spouted to and/or into the receiving chamber from taking in air.

According to one aspect of the invention, the system can for instance be brought from a first configuration into a second configuration and vice versa, while in the first configuration, the system is configured to substantially counteract or prevent formation of foam of the beverage, in particular when the beverage is spouted to and/or into the receiving chamber, while in the second configuration, the system is configured to increase the formation of foam of the beverage. In this manner, the system can be used to prepare both foamless and foam-containing beverage, depending on the configuration the system has been brought into. For instance, one or more parts of the system can be removable for bringing the system from the first into the second configuration and/or vice versa. Further, one or more parts of the system may be exchangeable with corresponding parts for bringing the system from the first into the second configuration and/or vice versa. Such removable and/or replaceable/exchangeable parts can for instance comprise the foam formation preventing surface, comprise a receiving chamber, comprise a nozzle and/or can comprise other parts.

According to one aspect of the invention, the system is provided with a holder for holding a covering (covering filter) filled, or to be filled with a product to be extracted, which holder may be provided, integrally or not integrally, with said nozzle, for spouting beverage into the receiving chamber. The holder can further be placeable on, for instance, the receiving chamber. This covering may comprise a pouch, pad or the like. The covering can comprise, for instance, filtering material, in which a product to be extracted is provided or can be included. The system can further be provided with, for instance, a housing part placed, during use, between the holder and the receiving chamber.

In one aspect of the invention, at least one receiving chamber is configured to substantially counteract or prevent foam formation of the beverage. Such a receiving chamber can be designed in various manners, as will be elucidated hereinbelow. One aspect of the invention further relates to a receiving chamber of a system according to the invention.

Another aspect of the invention provides an assembly, at least provided with an above-mentioned holder, wherein the assembly is designed for substantially counteracting or preventing foam formation of the beverage, while the assembly is further provided with, for instance, a nozzle and/or receiving chamber for spouting and receiving the beverage, respectively. A further aspect of the invention relates to a holder of an assembly of the invention.

According to one aspect of the invention, a method for preparing a beverage suitable for consumption, for instance coffee and/or tea, in particular utilizing a system according to the invention, a receiving chamber, an assembly and/or a receiving body, is characterized in that the method comprises:

dispensing beverage under pressure to a nozzle;
spouting the dispensed beverage into a receiving chamber, while foam formation of this beverage is substantially counteracted or prevented; and
dispensing the beverage received in the receiving chamber.

This method can offer the above-mentioned advantages. According to a further elaboration, a substantially continuous, preferably laminar beverage flow is formed from the beverage jet. The beverage flow may be collected and/or be fed to at least one outflow opening. The beverage can further for instance be spouted, with relatively high velocity, into the receiving chamber, while thereupon, the beverage is guided along a specific decelerating path to be decelerated relatively gradually, whereupon the decelerated beverage can be fed to at least one outflow opening.

Further advantageous embodiments of the invention are described in the subclaims. Presently, the invention will be clarified on the basis of a number of non-limitative exemplary embodiments and the drawing.

DESCRIPTION OF PREFERRED AND EXEMPLARY EMBODIMENTS

In the present application, identical or corresponding features are indicated with identical or corresponding reference marks.

Figure 1:
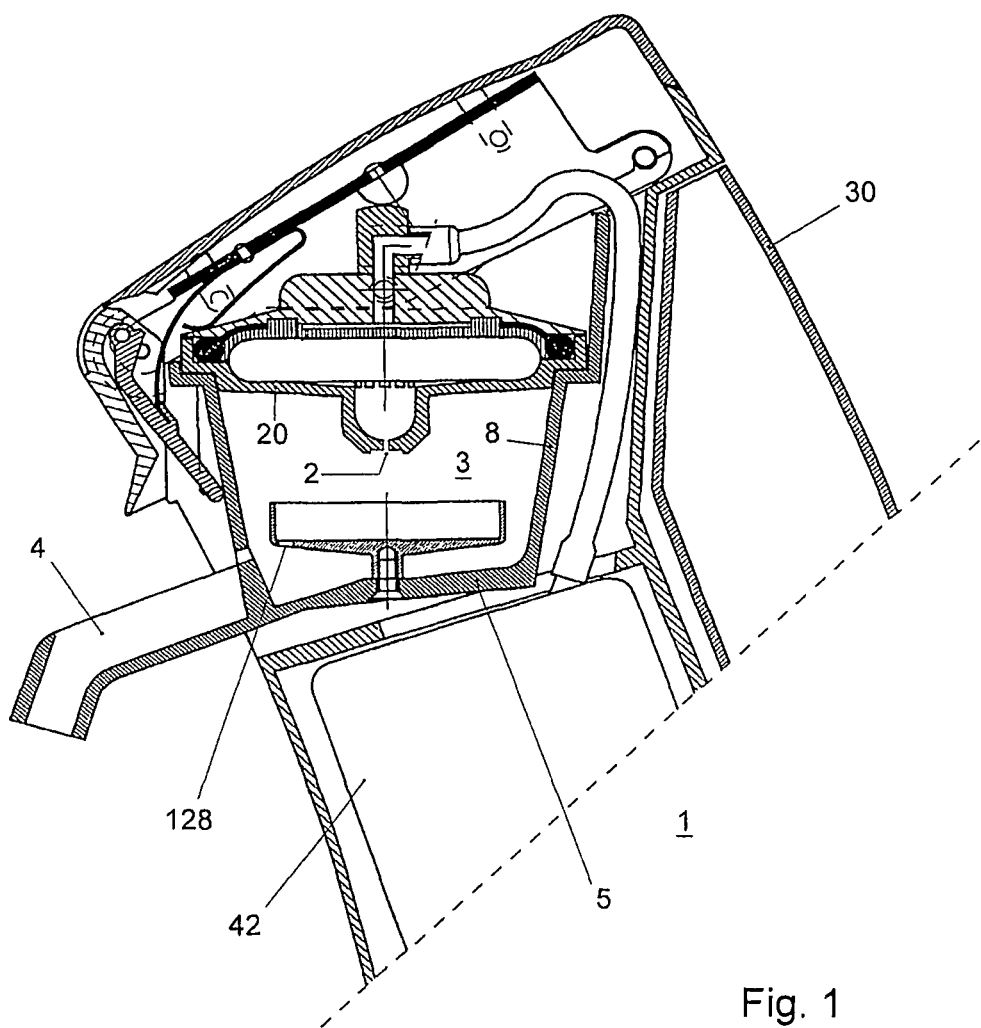
FIG. 1 shows a cross-section of an exemplary embodiment of a system for preparing a beverage suitable for consumption.

FIG. 1 shows a system known from the state of the art for preparing a beverage suitable for consumption, for instance coffee, provided with a device 1 for dispensing beverage under pressure to a nozzle 2 of the system, and at least one receiving chamber 3 which is placeable or is placed downstream relative to the nozzle 2, the arrangement being such that, during use, the nozzle 2 spouts a jet S (not represented in FIG. 1) of the beverage with relatively high velocity to and/or into the receiving chamber 3. The receiving chamber 3 comprises a bottom 5 and a, for instance, substantially cylindrical or frusto-conical sidewall 8, reaching upward from the bottom. The receiving chamber 3 is provided with at least one outflow opening 4 for dispensing beverage received in this chamber. The receiving chamber, or a part thereof, may be detachably connected to a housing 30 of the apparatus.

The system represented in FIG. 1 is further provided with a bowl-shaped holder 20 for holding a covering (not represented) which is or can be filled with a product to be extracted, which holder 20 is provided, in particular, with said nozzle 2 for spouting beverage into the receiving chamber 3. The holder 20 is placeable on the receiving chamber 3, as is represented in FIG. 1. The holder 20 is further detachably connected to the housing 30 of the apparatus. The covering which is or can be filled with a product to be extracted may comprise a pouch or the like, manufactured from filtering material and filled with product to be extracted, such as ground coffee.

The system represented in FIG. 1 is further provided with a bowl-shaped receiving reservoir 128, placed in the receiving chamber. During use of this known system, hot water can be fed from a hot water preparing element 42 to an upper side of a covering placed in the holder 20 and filled with a product to be extracted, for obtaining an extract. The extract is spouted into the receiving reservoir 128 by the nozzle 2, so that the reservoir 128 is filled with extract. Here, with the known system, the extract is spouted into the liquid surface of the receiving reservoir 128, so that the system can prepare a small-bubbled foam layer.

Figure 2:
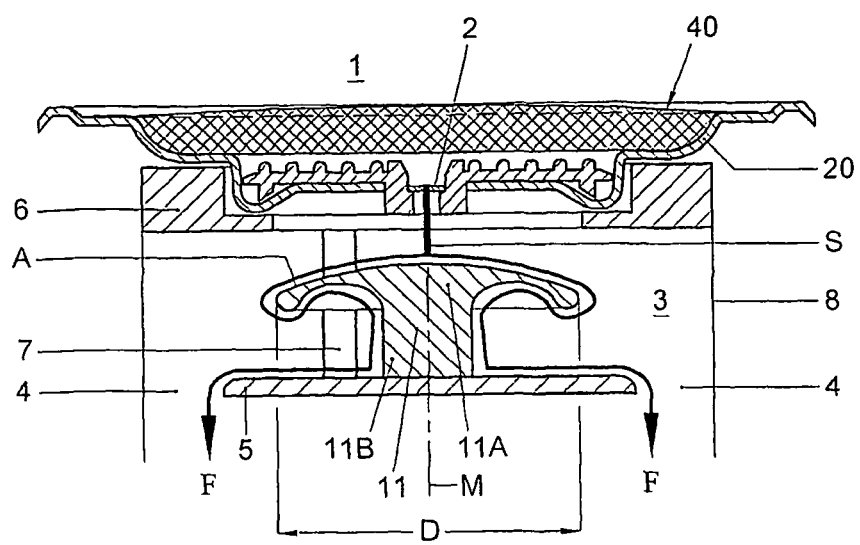
FIG. 2 shows a detail of a system according to one aspect of the invention.

FIG. 2 schematically shows a part of a first exemplary embodiment of the invention. The first exemplary embodiment comprises a system for preparing a beverage suitable for consumption, for instance coffee and/or tea. The system is provided with an apparatus 1 for dispensing beverage under pressure to one nozzle 2 of the system, and a receiving chamber 3 which is placeable or is placed downstream relative to the nozzle 2, the arrangement being such that, during use, the nozzle 2 spouts one jet S of the beverage with relatively high velocity to and/or into the receiving chamber 3. The receiving chamber 3 is provided with at least one outflow opening 4 for dispensing beverage received in this chamber 3. The system is furthermore provided with a holder 20 placeable on the receiving chamber 3 for holding a covering 40 which is or can be filled with a product to be extracted. Thus far, the design of the system represented in FIG. 2 corresponds to, for instance, corresponding features of the system represented in FIG. 1.

The system represented in FIG. 2 differs from the system represented in FIG. 1 at least in that it is configured to substantially counteract or prevent foam formation of the beverage, in particular when the beverage is spouted to and/or into the receiving chamber 3. The first exemplary embodiment is for instance designed such that, during use, the system substantially prevents turbulence of the beverage when the beverage is spouted to and/or into the receiving chamber 3. The system may further be designed such that, during use, the system substantially prevents the beverage spouted to and/or into the receiving chamber 3 from taking in air.

To this end, the system represented in FIG. 2 is provided, in particular, with a 3-dimensional foam formation preventing surface A that receives the beverage jet S during use of the nozzle 2. This surface A is preferably designed for ensuring, during use, in a relatively small space (such as the internal space of the receiving chamber 3), a gradual but rapid beverage flow deceleration. In the exemplary embodiment, the foam formation preventing surface A is designed such that, during use, the beverage jet S can spread and/or flow away substantially continuously along this surface A, in particular as a beverage layer flowing substantially in a laminar manner, substantially without forming foam. The beverage flow of the beverage spreading along the surface is indicated in FIG. 2 with lines F.

As shown in FIG. 2, the foam formation preventing surface A is, in particular, an outside of a dish-shaped upper part 11A of a receiving body 11 placed in the receiving chamber 3 downstream relative to the nozzle 2. As shown in FIG. 2, the foam formation preventing surface A can be provided by a top side as well as a bottom side, located downstream, of this upper part 11A, while during use, the beverage can flow from this top side to the bottom side. The receiving body 11 is designed for substantially counteracting or preventing foam formation of the beverage, in particular when the beverage is spouted onto that body 11. To this end, the receiving body 11 of the first exemplary embodiment is substantially of mushroom-shaped design, and is provided with the dish-shaped upper part 11A with a convex, in particular bent, for instance somewhat bulging top side, and a stem 11B extending centrally thereunder. A spherical foam formation preventing surface part, for instance a spherical top side of the receiving body 11, can be advantageous, in particular for use in a relatively small internal space of the system. The stem 11B may be connected to a receiving plate 5' of the receiving chamber 4, extending under the receiving body 11, which receiving plate 5' is connected to an upper wall 6 of this chamber 3 by a connecting part 7. This receiving body 11 can for instance extend substantially at a distance from a bottom of the receiving chamber 3, or, conversely, be provided on, or in this bottom. During use, the receiving body 11 can be arranged, for instance, substantially centrally in the receiving chamber, or at another position. Naturally, the receiving body 11 can also be connected differently, for instance to a different wall part of, for instance, the receiving chamber, or to said holder 20. It appears that such a receiving body 11 can prevent foam formation surprisingly well, depending on, for instance, inter alia, the type of beverage to be prepared and the flow rate of the beverage.

In particular, the system represented in FIG. 2 can be designed to first, during use, convert the beverage jet S into at least one substantially continuous beverage flow F, whose velocity is, preferably, gradually decelerated, and to, thereupon, dispense the substantially continuous beverage flow F via the outflow opening 4. It is further advantageous when the foam formation preventing surface A is a substantially smooth, flowing surface, the substantially smooth, flowing surface having, in particular, a surface roughness Ra which is smaller than approximately 50 µm and which, more particularly, is smaller than approximately 25 µm, or a different surface roughness. It is noted that the term "smooth" in the present application is to be understood relatively broadly. For instance, this smooth foam formation preventing surface A can for instance be provided with smooth transitions, for instance flowing curvatures (such as, for instance, a golf-ball surface or the like) as will be elucidated hereinbelow with the second exemplary embodiment.

Further, the receiving body 11 and the foam formation preventing surface A of the first exemplary embodiment are for instance each substantially rotation symmetrical relative to a virtual central axis M. In the exemplary embodiment, this central axis M extends, for instance, substantially centrally through the receiving chamber 3. The virtual central axis M can extend through, for instance, a center or middle part of the foam formation preventing surface, for instance substantially at right angles through such a center or middle part. The nozzle 2 is designed for directing the beverage jet S onto or near an upper center or middle part of the foam formation preventing surface A, as is represented in FIG. 2. A normal of the foam formation preventing surface A, which normal lies in the central axis M, is, for instance, substantially directed to the nozzle 2. At a position where the beverage jet S impacts on the foam formation preventing surface A, the normal can be virtually parallel to this jet, at least during use. Furthermore, for instance a part of the foam formation preventing surface A can comprise a flat surface part, for instance a central surface part extending opposite the nozzle 2. In this manner, the jet S can spread proportionally, for instance in all radial directions, over the foam formation preventing surface A of the receiving body 11.

This receiving body 11 can have various dimensions, depending on, for instance, the type of beverage and a flow rate, of which, during use, foam formation is prevented. For instance, a contour of this foam formation preventing surface A, in particular the contour of the dish-shaped upper part 11A of the receiving body 11, may have a diameter D which is greater than approximately half a diameter of this receiving chamber 3. The diameter D can also have a different value, see, for instance, the exemplary embodiments shown in FIGS. 8 and 9 (which are further elucidated hereinbelow). These diameters are, for instance, measured in a direction transverse to the central axis M. The foam formation preventing surface A can further extend at a specific distance from the nozzle 2, a distance of, for instance, more than approximately 1 mm, more particularly more than approximately 2 mm, for instance in a range of approximately 1 mm-2 cm, or a different distance. It is preferred that this distance is such that beverage spreading during use over the receiving body 11 substantially no longer contacts the nozzle 2, or any drops that may hang around the nozzle 2. In one aspect of the invention, the foam formation preventing surface A is integrated on or in the receiving chamber 3. On the other hand, this foam formation prevention surface, or a part provided with this surface, in FIG. 2 the receiving body 11, may be removable from this receiving chamber 3. The receiving body 11 can at least be brought from, for instance, the foam preventing position, downstream relative to the nozzle 2, to another position, in which other position the receiving body 11 is not used for counteracting or preventing the formation of foam.

According to one aspect of the invention, it is advantageous when the system can at least be brought from a first configuration to a second configuration, and vice versa. FIG. 2 shows, for instance, a first configuration, in which the system is configured to substantially counteract or prevent formation of foam of the beverage, in particular when the beverage is spouted to and/or in the receiving chamber 3. In a second configuration (not shown) the system may be configured to increase the formation of foam of the beverage. To that end, the mushroom shaped receiving body 11 can be removable from the receiving chamber 3, or can be replaced by a foam formation receiving reservoir 128 represented in FIG. 1, or a different foam enhancing construction.

Further, with a system represented in FIG. 1, or a similar system, a foam preventing body 11 can be placed in the receiving reservoir 128, or a similar reservoir, to change the configuration of the system. A receiving body 11 suitable for foam formation prevention can for instance be placed in the receiving reservoir 128 in a detachable manner, be fixed and/or the like relative to the receiving reservoir in a suitable foam preventing position by means of detachable or non-detachable couplings. The latter couplings can comprise various connecting means, for instance snap connections, clamping connections, glue connections and/or other suitable couplings.

The invention can for instance also be embodied in an assembly provided at least with one holder 20, wherein the assembly is designed for substantially counteracting or preventing formation of foam of the beverage, while the assembly is, in particular, provided with a nozzle 2 and/or receiving chamber 3 for spouting and receiving the beverage, respectively. By designing suitable parts of this assembly to be replaceable and/or removable from the system, the system can be brought from a first into a second configuration or vice versa, in a relatively simple manner for, for instance first preparing a foamless beverage and then a beverage provided with foam. A holder 4 and/or receiving chamber 3 specifically designed for preventing foam can be supplied separately from the system, for, for instance, replacing a foam forming holder and/or foam forming receiving chamber of the beverage preparing system.

The system represented in FIG. 2 is designed for, for instance, during use, dispensing beverage under pressure to the nozzle, which pressure is, for instance, superatmospheric and is, for instance, in the range of approximately 0.8-2.5 bar, preferably 1.0-0.8 bar. The first exemplary embodiment is further designed for during use dispensing a beverage flow rate to the nozzle 2, which flow rate may be in the range of approximately 2-8 ml/s, preferably 5-7 ml/s. Further, an average diameter of a beverage jet of the system dispensed during use by the nozzle 2, can be in the range of approximately 0.5-1.2 mm, preferably approximately 0.85-0.95 mm. The system can also, for instance, utilize other values of the above-mentioned parameters pressure, flow rate and beverage jet diameter mentioned hereinabove.

During use of the system represented in FIG. 2, for instance a substantially foamless tea can be brewed, by placing a holder 20 filled with tea in the covering 40. A tea extract is then obtained, which extract can be dispensed under pressure to the nozzle 2 so that this beverage is spouted, in particular with a relatively high velocity, as a jet S on the top side of the receiving body 11. As mentioned hereinabove, the beverage may be dispensed to the nozzle under a pressure, which pressure may be in the range of 0.8-2.5 bar, preferably 1.0-1.8 bar. Furthermore, the beverage flow rate dispensed to the nozzle may be in the range of approximately 2-8 ml/s, preferably 5-7 ml/s.

Thereupon, the receiving body 11 can spread the beverage over the foam formation preventing surface A, while, inter alia, the flow rate and the surface A are preferably such that along this surface A, the beverage substantially reaches a layer thickness or film thickness that may be in the range of approximately 0.01-1 mm, or in a different range. This layer thickness can already be reached at a relatively short distance between an impact area of the beverage jet S on the surface A. The foam formation preventing surface A provides, for instance, a specific decelerating path, along which the beverage is guided and can be decelerated relatively gradually. Such a gradual deceleration can comprise, for instance, a substantially constant deceleration, viewed in a flow direction of the beverage, and/or non-linear deceleration, a substantially quadratic deceleration and/or other deceleration. Preferably, the beverage deceleration, at least along this foam formation preventing surface A, is not abrupt. The decelerating path can for instance comprise a 3-dimensional path (see, for instance, the first, second and fifth exemplary embodiments in FIGS. 2, 7, 10), or a substantially 2-dimensional path (see, for instance, the third and fourth exemplary embodiments in FIGS. 8 and 9), or, for instance, a 1-dimensional path (not represented).

During use, the beverage jet can for instance be spread in a substantially continuous manner, in at least one relatively thin layer over the foam formation preventing surface A, and be discharged to at least one outflow opening. As shown in FIG.

2, the beverage can spread both over the top side and over the bottom side of the upper part 11a of the receiving body 11, under the influence of, for instance, adhesion. Spreading via the bottom side can provide a good deceleration of the beverage, in particular when this bottom side is provided with, for instance, a concave part (see FIG. 2). In this manner, a substantially continuous, preferably laminar beverage flow F can be formed from the beverage jet S. Downstream relative to the foam formation preventing surface A, the beverage flow F, at least decelerated beverage, can for instance be collected again and be fed to the outflow opening 4.

FIGS. 3-7 show a part of a second exemplary embodiment of the invention. The second exemplary embodiment differs from the first exemplary embodiment represented in FIG. 2 in that a bottom 5 of the receiving chamber 3 extending opposite the nozzle 2 comprises the foam formation preventing surface A. The foam formation preventing surface A is provided with, for instance, surface increasing profiling, in particular a substantially undulating surface or surface part, viewed in cross-section (see FIG. 7). The foam formation preventing surface A of the second exemplary embodiment is provided with one or more substantially circular ripples, however, it will be clear that the foam formation preventing surface A can also be undulated in a different manner.

Figure 3:
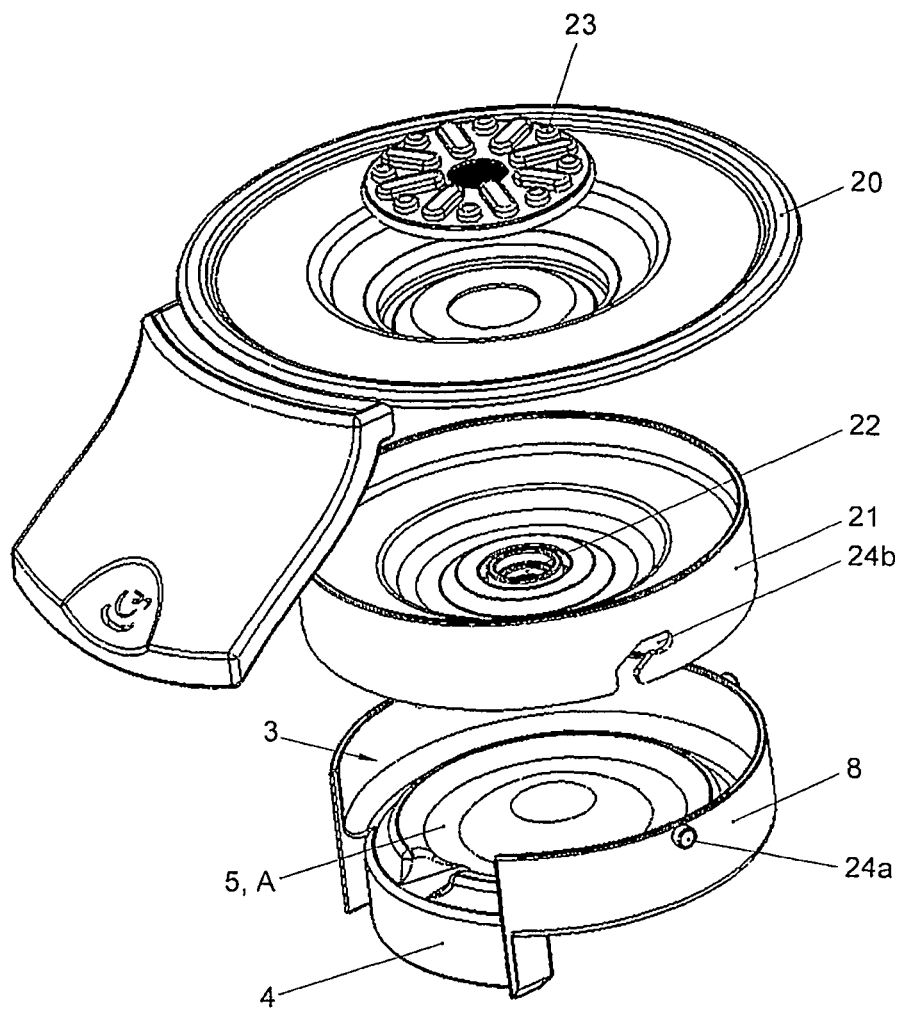
FIG. 3 shows a perspective top plan view of a part of a second exemplary embodiment, in disassembled condition.
Figure 4:
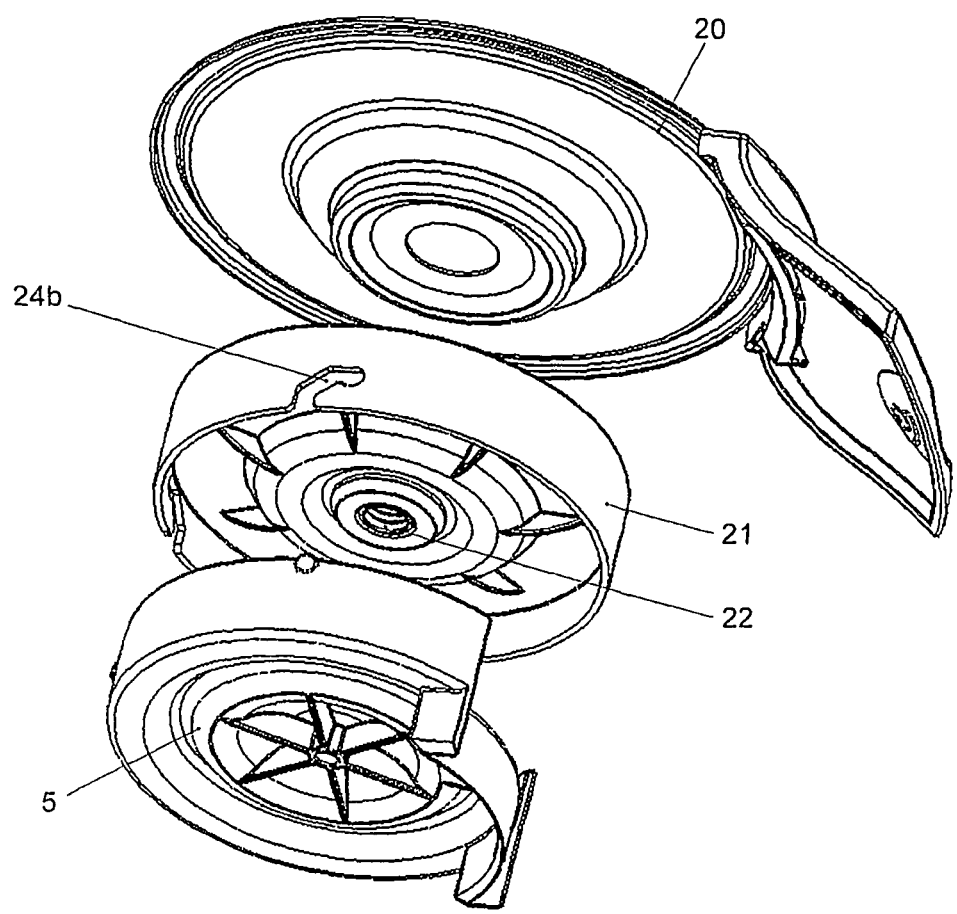
FIG. 4 shows a perspective bottom view of the part of the second exemplary embodiment represented in FIG. 3, in the disassembled condition.
Figure 5:
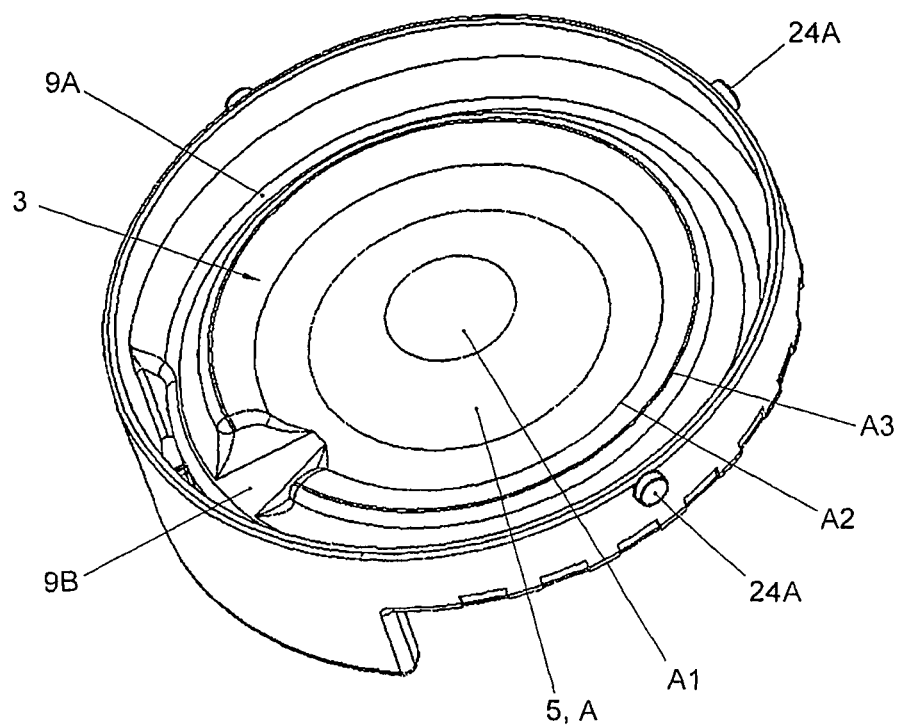
FIG. 5 shows a perspective top plan view of a receiving chamber part of the second exemplary embodiment.
Figure 6:
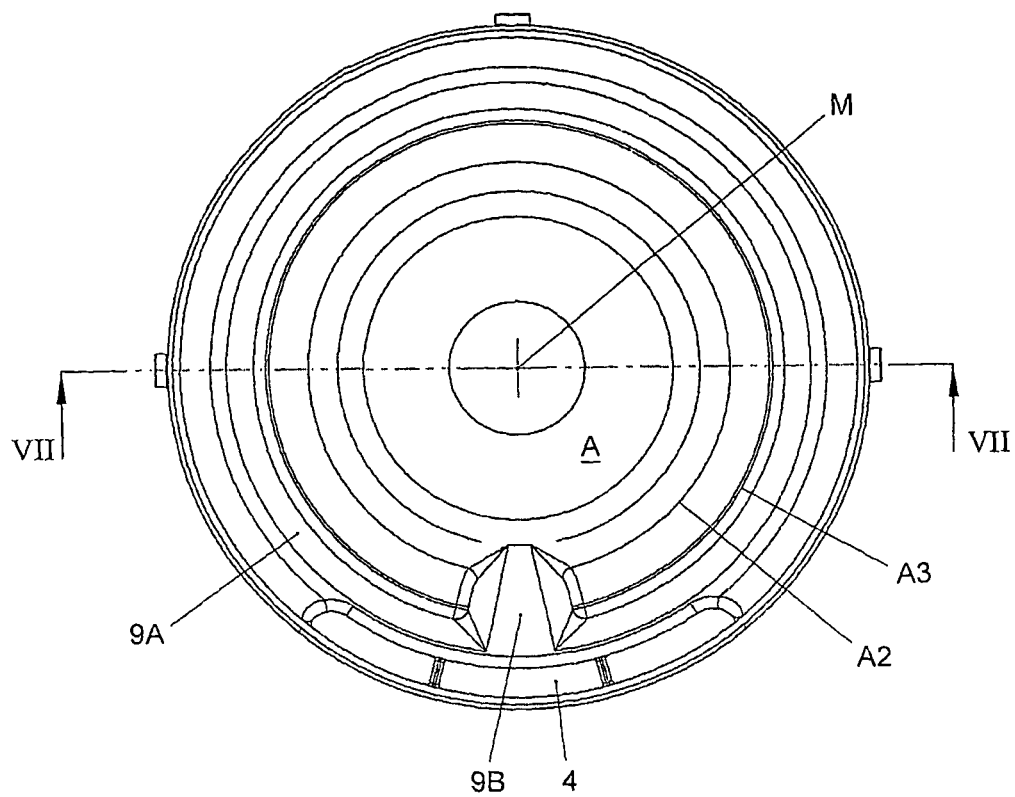
FIG. 6 shows a top view of the receiving chamber part represented in FIG. 5.

As further shown in FIGS. 3 and 4, the second exemplary embodiment is provided with a holder 20, with a part 23 placeable thereon provided centrally on a lower side of one nozzle 2 (not visible in FIGS. 3-4).

The second exemplary embodiment is further provided with, for instance, a substantially cylindrical housing part 21 which, during use, can be placed between, for instance, the holder 20 and the receiving chamber 4. This housing part 21 can, for instance, form a spacer between the holder 20 and the receiving chamber 3, or bottom 5 thereof. This housing part 21 may be provided with a passage 22, in the exemplary embodiment a central passage, for allowing passage of the beverage jet S coming from the nozzle 2. This housing part 21 can be coupled, for instance, to or on a sidewall 8 of the receiving chamber 3, or to a different part of the system, for instance with suitable clamping connection, snap connection, bayonet connection 23a, 24b or other coupling.

Figure 7:
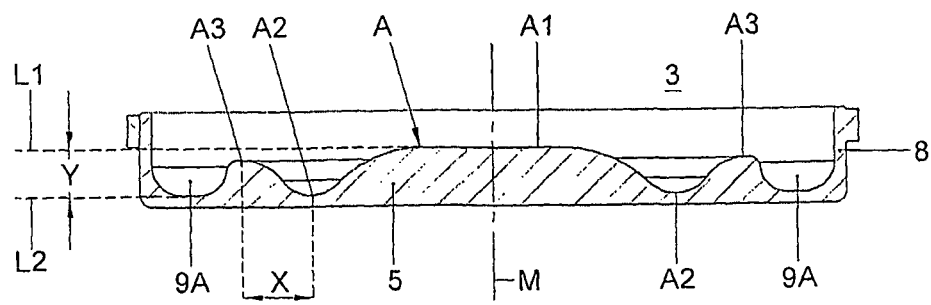
FIG. 7 shows a cross section along the line VII-VII of FIG. 6.

In the second exemplary embodiment, this foam formation preventing surface A is provided with a substantially flat, central surface part A1, extending substantially transverse to a spouting direction of the nozzle 2. The foam formation preventing surface is further provided with a surface part A2, surrounding the flat surface part A, and recessed with respect thereto, at least recessed in a direction away from the nozzle 2. This recessed surface part A2 is substantially surrounded by an elevated surface part A3 of the foam formation preventing surface A. This elevated surface part A3 can extend to approximately the same height as the flat surface part A1. Around the foam formation preventing surface A, in particular around the elevated surface part A3, a concentric receiving channel 9A may be provided, which can be surrounded by a sidewall 8 of the receiving chamber 3. The receiving channel 9A provides a beverage collecting area for collecting decelerated beverage flowing radially, and for discharging it to an outflow opening 4. The foam formation preventing surface A may further be provided with a recessed discharge part 9B, for instance a discharge channel 9B extending in radial direction, for discharging beverage, in particular to the outflow opening 4. As shown in the Figures, the recessed discharge part 9B extends, for instance, through the elevated surface part A3. It is preferred that the different parts of the foam formation preventing surface A merge smoothly, viewed in radial directions from the central part A1. Further, neighbouring peaks and lows of the undulations of the foam formation preventing surface A may be located at various distances X from each other (see FIG. 7). As shown in FIG. 7, somewhat sinusoidal undulations or different, relatively gradual curvatures, can be provided in the foam formation preventing surface A.

In one aspect of the invention, the foam formation preventing surface A extends at least from a first level L1 to a second, lower level L2 (see FIG. 7), while the vertical distance Y between the first and second level may comprise various distances.

The use of the second exemplary embodiment proceeds analogously to the above-described use of the first exemplary embodiment, wherein one beverage jet is spouted on a central part A1 of the foam formation preventing surface A. With the second exemplary embodiment, the beverage can then spread uniformly over the undulations or ripples of this surface A, over the central part A1, the recessed part A2, the elevated part A3, in radial directions away from the central axis M. Here, it is preferred that the beverage forms a relatively thin flow film of a relatively constant thickness. This flow film, which—viewed in radial directions—can be considerably decelerated upon spreading over the surface A, can be received by the concentric receiving channel 9A. This receiving channel 9A can then be filled with beverage to a specific height (higher than the film thickness). The radial discharge channel 9B can for instance also ensure that the beverage level in the recessed part A2 remains relatively low during use, but this is not necessary.

The foam formation preventing surface A of the second exemplary embodiment is a relatively large, preferably smooth surface. The various concentric inclinations, or undulations of this surface can contribute in an effective manner to the gradual deceleration of the beverage, in a relatively small space so that formation of foam can be prevented well.

Figure 8:
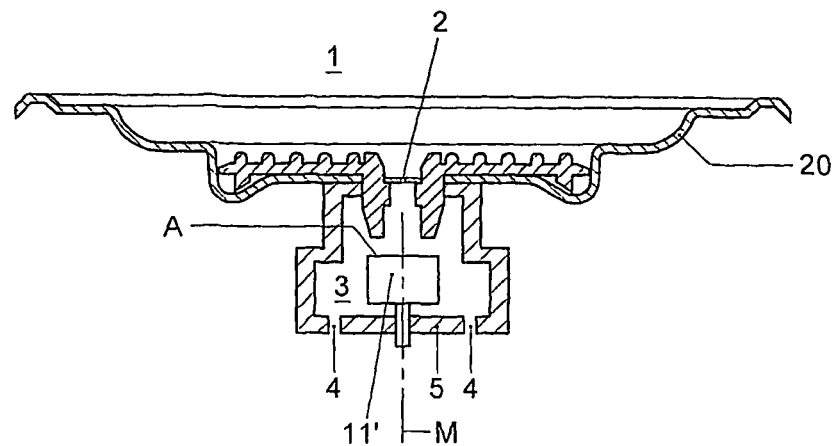
FIG. 8 shows a similar detail as FIG. 2 of a third exemplary embodiment of the invention.

FIG. 8 shows a part of a third exemplary embodiment which differs from the exemplary embodiment represented in FIG. 2 in that the foam formation preventing surface A is a substantially 2-dimensional, substantially flat surface. With the third exemplary embodiment, the flat foam formation preventing surface A forms, in particular, an outside of a receiving body 11' placed in the receiving chamber 3, downstream relative to the nozzle 2. In particular, the receiving body 11' is a relatively large disc or the like placed opposite the nozzle 2. In the represented configuration, the foam formation preventing surface A of the third exemplary embodiment extends substantially transverse to a beverage jet (not represented) spouted, during use, by the nozzle 2 on the surface A. The operation of the third exemplary embodiment proceeds, for instance, in a manner substantially corresponding to the operation of the exemplary embodiment represented in FIG. 2, while the beverage can spread along the foam formation preventing surface A in radial directions, for instance radial relative to a central axis M, and can be decelerated.

Figure 9:
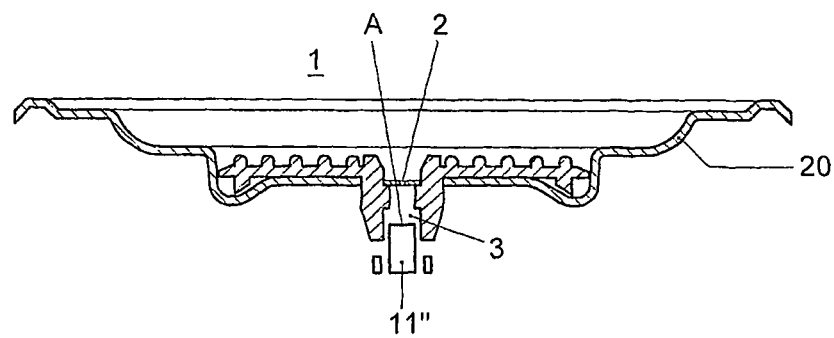
FIG. 9 shows a similar detail as FIG. 2 of a fourth exemplary embodiment of the invention.

FIG. 9 shows a part of a fourth exemplary embodiment, which differs from the exemplary embodiment represented in FIG. 8 in that the foam formation preventing surface comprises a relatively small surface A which is placed adjacent the nozzle 2. In particular, the receiving body 11" of the third exemplary embodiment is a relatively small disc, with a substantially flat foam formation preventing surface A.

Figure 10:
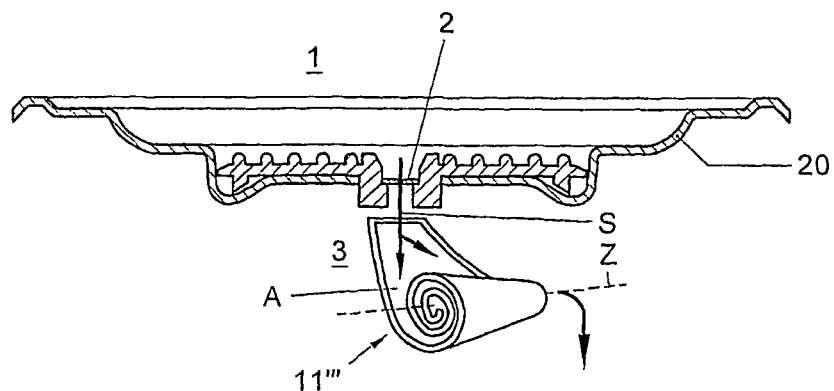
FIG. 10 shows a similar detail as FIG. 2 of a fifth exemplary embodiment of the invention.

FIG. 10 shows a part of a fifth exemplary embodiment, which differs from the exemplary embodiment represented in FIG. 2 in that the foam formation preventing surface comprises a relatively long surface A of a curl-shaped receiving body 11''' placed opposite the nozzle 2. In this case, the foam formation preventing surface A is for instance a surface rolled into itself or wound onto itself over a specific distance, or a curled surface of the body 11''', in a manner such that a beverage flow S can, for instance, be received on or in the body 11''', between windings or a curl of this surface A, and can be decelerated. A virtual central axis Z of the curl of the receiving body 11''' can extend substantially transversely to the spouting direction of the nozzle 2, or in a different direction. With such a receiving body 11''' or foam formation preventing surface A, respectively, the beverage can be decelerated well in a relatively compact space.

It is self-evident that the invention is not limited to the exemplary embodiments described. Various modifications are possible within the framework of the invention as set forth in the following claims. For instance, features of the above-described exemplary embodiments can be combined in various manners. For instance, a receiving body can be provided with an undulating foam formation preventing surface A, or the like.

The invention claimed is:

1. A system for preparing a beverage suitable for consumption, for instance coffee and/or tea, the system comprising:
    an apparatus for dispensing beverage under pressure to a nozzle, and
    at least one receiving chamber which is placeable or is placed downstream relative to said nozzle such that, during use, the nozzle spouts a jet of said beverage with a relatively high velocity to and/or into the receiving chamber, the receiving chamber being provided with at least one outflow opening for dispensing beverage received in the chamber,
    wherein the system is at least configured to substantially counteract or prevent formation of foam of this beverage, in particular when the beverage is spouted to and/or into the receiving chamber;
    wherein the receiving chamber is provided with a foam formation preventing surface which receives said beverage jet during use of said nozzle, the foam formation preventing surface comprises at least one of a bent surface and bent surface part, such that the beverage jet can spread along said surface and can flow away therealong, as a beverage layer flowing in a substantially laminar manner, substantially without forming foam, and wherein the foam formation preventing surface is at least provided with a substantially undulating surface part, the surface being provided with one or more substantially circular ripples;
    wherein the system can at least be brought from a first configuration into a second configuration and vice versa, while in the first configuration, the system is configured to substantially counteract or prevent formation of foam of the beverage while in the second configuration, the system is configured to increase the formation of foam of the beverage;
    wherein one or more parts of the system are one of removable for bringing the system from the first into the second configuration and/or vice versa, and exchangeable with corresponding parts for bringing the system from the first into the second configuration and/or vice versa;
    wherein the foam formation preventing surface includes a central flat surface part, a recessed surface part extending entirely around the flat surface part and recessed relative to the flat surface part, and an elevated continuous surface part extending substantially around the recessed surface part, wherein the flat surface part, the recessed surface part, and the elevated surface part form a continuous surface.

2. The system according to claim 1, further comprising means for substantially gradually decelerating said beverage downstream relative to the nozzle and upstream relative to the outflow opening by at least one of spreading the beverage of the beverage jet over a specific surface and guiding the beverage jet along a decelerating path in the first configuration.

3. The system according to claim 1, wherein a bottom of the receiving chamber extending opposite said nozzle comprises said foam formation preventing surface.

4. The system according to claim 1, wherein a normal of said foam formation preventing surface is substantially directed to said nozzle.

5. The system according to claim 1, wherein, at a position where said beverage jet impacts on said surface, a normal of the foam formation preventing surface is directed at least virtually parallel to said jet, during use.

6. The system according to claim 1, wherein said flat surface part extends substantially transversely to a spouting direction of said nozzle.

7. The system according to claim 1, wherein said elevated surface part extends to approximately the same height as said flat surface part.

8. The system according to claim 1, provided with a receiving channel extending substantially around said foam formation preventing surface, for collecting a beverage flow of said surface.

9. The system according to claim 1, wherein a contour of said foam formation preventing surface has a diameter which is greater than approximately half a diameter of said receiving chamber.

10. The system according to claim 1, wherein said foam formation preventing surface, or a part provided with that surface, is removable from said receiving chamber or another part of the system.

11. The system according to claim 1, wherein said foam formation preventing surface extends at a distance from said nozzle, a distance in a range of approximately 1 mm-2 cm.

12. The system according to claim 1, wherein the system is provided with a beverage jet receiving body which is placeable or is placed downstream relative to said nozzle, which body is designed to substantially counteract or prevent formation of foam of said beverage when the beverage is spouted onto or in said body in the first configuration.

13. The system according to claim 12, wherein said beverage jet receiving body is placeable or is placed in said receiving chamber.

14. The system according to claim 13, wherein said receiving body is provided with said foam formation preventing surface.

15. The system according to claim 13, wherein said receiving body can be brought at least from a foam preventing position, downstream relative to the nozzle, to another position, in which other position the receiving body is not used or cannot be used for counteracting or preventing foam formation.

16. The system according to claim 12, wherein said receiving body extends substantially at a distance from a bottom of the receiving chamber.

17. The system according to claim 12, wherein, during use, said receiving body is arranged substantially centrally in said receiving chamber.

18. The system according to claim 1, wherein the system is designed such that, during use in the first configuration, the system substantially prevents turbulence of said beverage when the beverage is spouted towards and/or into the receiving chamber.

19. The system according to claim 1, wherein the system is designed such that, during use, the system substantially prevents the beverage spouted towards and/or in to the receiving chamber from taking in air.

20. The system according to claim 1, wherein the system is designed for, during use, dispensing beverage under pressure to the nozzle, which pressure is in the range of approximately 1.0-1.8 bar.

21. The system according to claim 20, wherein the system is designed for, during use, dispensing a beverage flow rate to the nozzle, which flow rate is in the range of approximately 5-7 ml/s.

22. The system according to claim 21, wherein an average diameter of a beverage jet dispensed during use by the nozzle is in the range of approximately 0.85-0.95 mm.

23. The system according to claim 1, provided with a holder for holding a covering which is or can be filled with a product to be extracted, which holder is provided with said nozzle for spouting beverage into said receiving chamber and, more particularly, is placeable on said receiving chamber.

24. The system according to claim 23, wherein the system is provided with a housing part which is placed, during use, between said holder and the receiving chamber, for instance as spacer.

25. The system according to claim 24, wherein at least one said receiving chamber is configured to substantially counteract or prevent formation of foam of said beverage.

26. The system according to claim 25, configured to convert, during use, said beverage jet first into at least one substantially continuous beverage flow, and to then dispense the substantially continuous beverage flow via said outflow opening.

27. The system according to claim 23, wherein an assembly is designed for substantially counteracting or preventing formation of foam of said beverage in the first configuration, the assembly further being provided with one of said nozzle and said receiving chamber for spouting and receiving said beverage, respectively.

28. A method for preparing a beverage suitable for consumption utilizing a system, and/or a receiving body, the method comprising:
dispensing beverage under pressure to a nozzle;
spouting the dispensed beverage into a receiving chamber, while formation of foam of said beverage is substantially counteracted or prevented; and
dispensing the beverage received in the receiving chamber via at least one outflow opening;
wherein the receiving chamber is provided with a foam formation preventing surface which receives a beverage jet during use of said nozzle, the foam formation preventing surface comprising at least one of a bent surface and bent surface part, such that the beverage jet can spread along said surface and can flow away therealong, as a beverage layer flowing in a substantially laminar manner, substantially without forming foam, and wherein the foam formation preventing surface is at least provided with a substantially undulating surface part, the surface being provided with one or more substantially circular ripples;
wherein the system can at least be brought from a first configuration into a second configuration and vice versa, while in the first configuration, the system is configured to substantially counteract or prevent formation of foam of the beverage while in the second configuration, the system is configured to increase the formation of foam of the beverage;
wherein one or more parts of the system are one of removable for bringing the system from the first into the second configuration and/or vice versa, and exchangeable with corresponding parts for bringing the system from the first into the second configuration and/or vice versa;
wherein the foam formation preventing surface includes a central flat surface part, a recessed surface part extending entirely around the flat surface part and recessed relative to the flat central part, and an elevated continuous surface part extending substantially around the recessed surface part, wherein the flat surface part, the recessed surface part, and the elevated surface part form a continuous surface.

29. The method according to claim 28, wherein the beverage is dispensed to the nozzle under a pressure, which pressure is in the range of approximately 1.0-1.8 bar.

30. The method according to claim 28, wherein a beverage flow rate is dispensed to the nozzle, which flow rate is in the range of approximately 5-7 ml/s.

31. The method according to claim 28, wherein said beverage jet is spread substantially continuously in at least one relatively thin layer and is discharged to at least one outflow opening.

32. The method according to claim 28, wherein a substantially continuous laminar beverage flow is formed from said beverage jet.

33. The method according to claim 28, wherein said beverage is spouted with relatively high velocity into the receiving chamber, while thereupon, the beverage is guided along a specific decelerating path to be decelerated relatively gradually, whereafter the decelerated beverage is fed to at least one outflow opening.

34. The method according to claim 28, wherein said beverage is collected in a collecting area of the receiving chamber and thence is fed to said outflow opening.

35. The method according to claim 28, wherein said beverage is at least substantially gradually decelerated in an area situated downstream relative to said nozzle and upstream relative to said outflow opening.

* * * * *